Oct. 30, 1923.

F. C. VAN ESELTINE 1,472,445

CONVEYING APPARATUS

Filed May 22, 1920

INVENTOR.
Floyd C. Van Eseltine
BY
Parsons & Bodell.
ATTORNEYS.

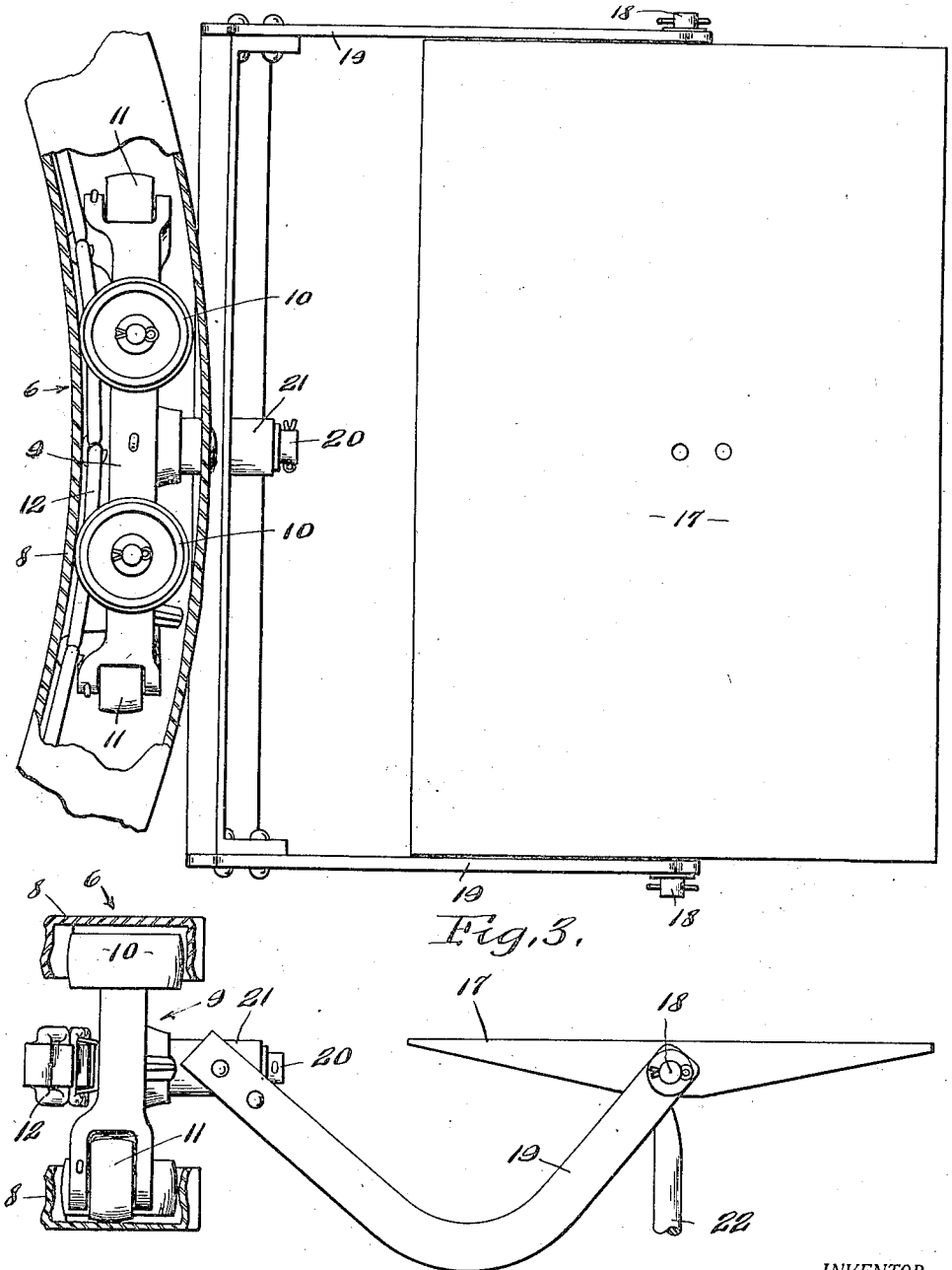

Patented Oct. 30, 1923.

1,472,445

UNITED STATES PATENT OFFICE.

FLOYD C. VAN ESELTINE, OF EASTWOOD, NEW YORK.

CONVEYING APPARATUS.

Application filed May 22, 1920. Serial No. 383,570.

*To all whom it may concern:*

Be it known that I, FLOYD C. VAN ESELTINE, a citizen of the United States, and a resident of Eastwood, in the county of Onondaga and State of New York, have invented a certain new and useful Conveying Apparatus, of which the following is a specification.

This invention relates to conveying apparatus, and has for its object a conveying apparatus which is shiftable to different inclinations and provided with article carriers which maintain a horizontal position at any inclination of the conveyor, which conveying apparatus is particularly simple in construction, and highly efficient and durable in use. The invention consists in the combinations and constructions hereinafter set forth and claimed.

In describing this invention, reference is had to the accompanying drawings in which like characters designate corresponding parts in all the views.

Figure 3 is an enlarged plan view of the article carrier and supporting bracket therefor, the contiguous part of the conveyor and track therefor being shown in section.

Figure 4 is an elevation looking upwardly in Fig. 3.

Figure 1:
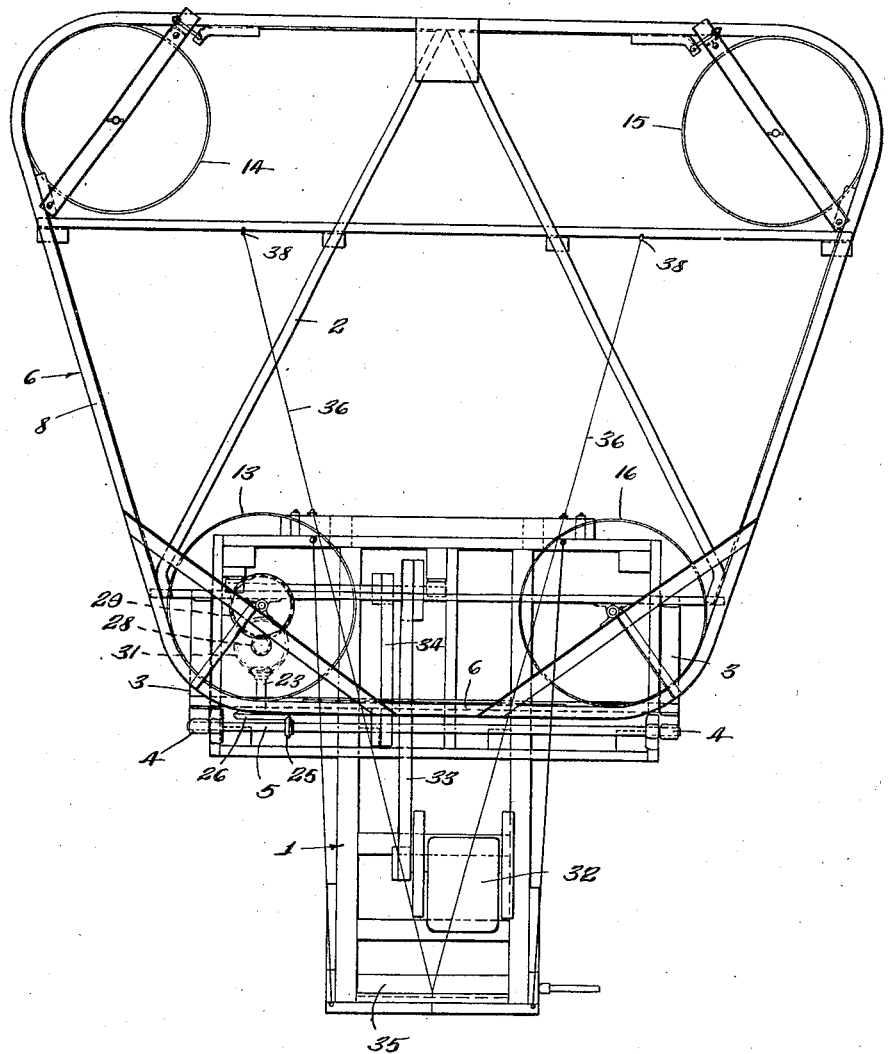
Figures 1 and 2 are respectively, a plan and a side elevation of a preferable form of this apparatus.
Figure 2:
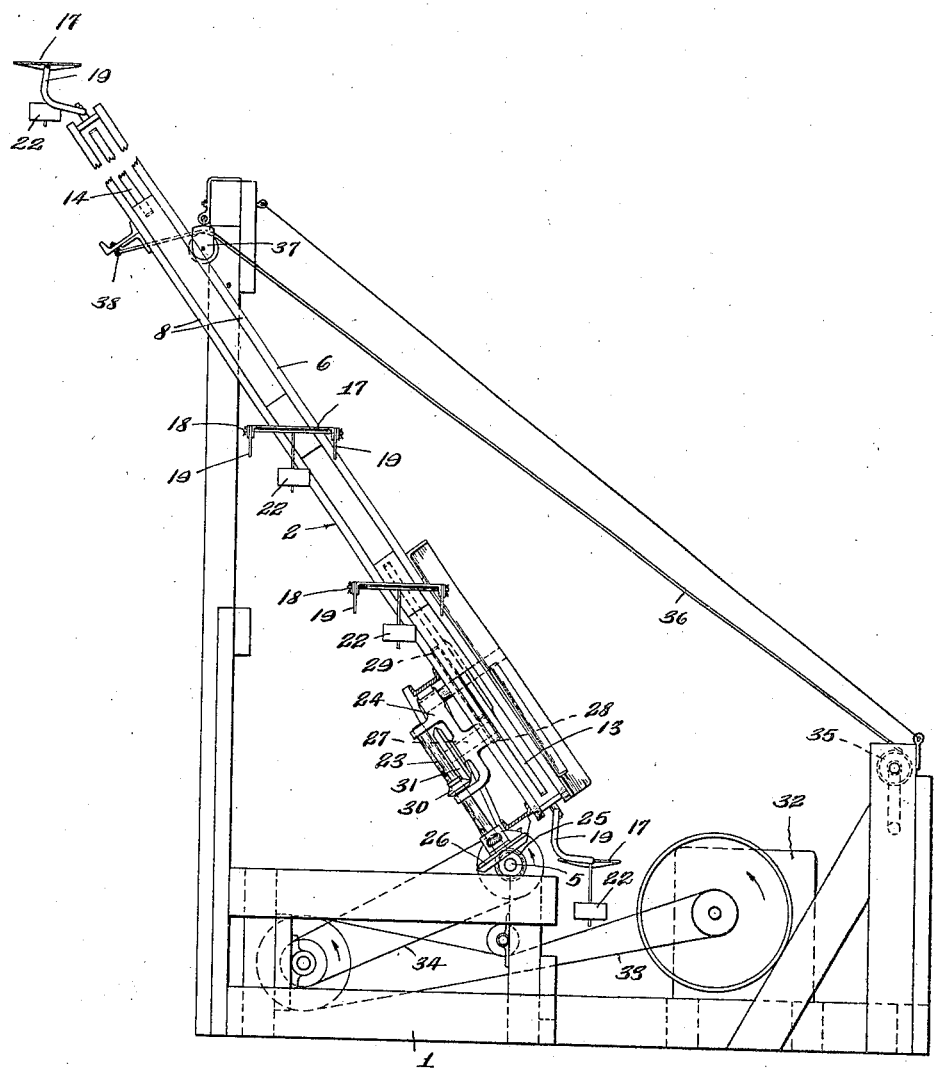

This conveying apparatus is particularly designed for use in brick yards and similar situations to convey articles from the ground to the ovens or storage space, where the pile in the oven or storage space gradually increases in height and the object of the invention is to provide an apparatus in which the delivery end thereof can be raised at intervals to the same elevation as the top of the pile to which the bricks or other articles are to be transferred by the workman from the conveyor to the top of the pile.

The conveyor apparatus comprises generally, a main frame, a conveyor frame hinged to the main frame on a horizontal axis, a conveyor movable around the conveyor frame, article carriers supported by the conveyor and connected thereto to swing into a horizontal position at all elevations or angular adjustments of the conveyor frame about its horizontal axis, and means for elevating and lowering the conveyor frame about its axis.

1 designates the main frame which may be of any suitable form, size and construction. 2 designates the conveyor frame which is in the general form of a four sided figure or quadrangle although it may be circular. The frame includes members 3 at one end thereof which have bearings 4 on a horizontal shaft 5 journaled in the main frame 1. 6 is an endless track extending around the frame 2 and having one run or portion thereof extending near and parallel to the shaft 5 and its opposite run or portion at the end remote from the shaft 5 also parallel to the shaft 5. The track 6 as here shown, includes upper and lower channel irons 8 facing upwardly and downwardly and extending around the lateral sides and ends of the conveyor frame.

The endless conveyor moves along and is guided by the track 6 and may be of any suitable form, size and construction, it being here shown as including units or cars 9 having front and rear trucks or wheels 10 arranged to engage the side flanges of the channels 8, and also front and rear wheels 11 arranged in advance and to the rear respectively, of the wheels 10 and arranged to engage the bottoms of one of the channel irons 8 as the lower channel iron.

The cars or units 9 are connected together by an endless belt, as a sprocket chain 12, extending lengthwise of the cars between the wheels 10 and exposed between the channel irons 8. The belt or chain 12 runs over suitable pulleys or sprocket wheels 13, 14, 15, 16 mounted in the corners of the conveyor frame in any suitable manner.

17 designates the article carriers which are in the form of trays, the carriers being supported from the cars or units 9 so that they always maintain a horizontal position. As here shown, these article carriers or trays are pivoted or hinged on shafts 18 extending in the direction of movement of the conveyor, the pivots being mounted in brackets 19 which are in turn pivoted or mounted on studs 20 projecting from the cars 9, the brackets having bearings 21 mounted on the studs and the studs being arranged with their axes substantially radially relatively to the pivots 18 of trays 17. Thus, the trays or article carriers are connected to the conveyor by universal joints or by means capable of movement about two axes at an angle to each other.

A suitable weight 22 is suspended from each tray substantially centrally thereof which weight tends to swing and hold the tray in horizontal position.

The means for actuating the conveyor comprises the shaft 5, a shaft 23 journaled in the bracket 24 supported by the conveyor frame 2 near the lower end thereof, the shaft 23 being arranged radially relative to the shaft 5, intermeshing bevel gears 25, 26 mounted respectively on the shafts 5 and 23, a third shaft 27 journaled in the bracket 24 at a right angle to the shaft 23, intermeshing gears 28, 29 between the upper end of the shaft 27 and the sprocket wheel 13 and additional intermeshing gears 30, 31 between the shaft 23 and the shaft 27.

The shaft 5 is connected to a suitable power plant 32, the connections being shown as including belts 33, 34 running over suitable pulleys.

The conveyor frame 2 is shifted about the axis of the shaft 5 to lift the delivery end thereof by any suitable means as by a windlass 35 journaled in the main frame 1, the cable 36 of the windlass running over a pulley 37 supported by the frame above the conveyor frame and being connected to the conveyor frame at 38.

In operation, one workman, stands at the lower end of the conveyor frame, and the other near the free end of the conveyor frame, on the ground when the pile to which the articles as bricks are being transferred is low, and on a platform as the pile increases in height. The workman at the lower end of the conveyor frame places the bricks on the trays 17 as they come opposite him during the movement of the conveyor and they are carried around the conveyor frame to the workman at the upper end of the conveyor frame, which workman transfers and piles them in the oven. If the latter workman fails to remove the bricks, they are not dumped on the ground but are again carried around by the conveyor.

Owing to the construction of the mounting for the article carriers or trays 17 they always maintain a horizontal position. As before stated, this apparatus is designed for use in conveying bricks to kilns to be baked and is particularly advantageous in that the bricks can be conveyed without injury to them, and are not dumped and injured in case the workman neglects to remove them from the conveyor.

It is further advantageous as it relieves the workman of the greater part of the arduous labor now necessary in lifting the bricks into the kilns.

What I claim is:

In a conveying apparatus, the combination of a main frame, a horizontal shaft mounted in the main frame, a conveyor frame mounted on the shaft and movable about the axis thereof into different angular positions, the conveyor frame comprising a track quadrangular in general form extending around the margin of the main frame and arranged with the end runs thereof extending horizontally, one horizontal end of the conveyor frame extending parallel to and near the shaft, a conveyor movable along the track and comprising article carriers including trays, said carriers being mounted on the conveyor to automatically maintain the trays in horizontal position during the movement of the conveyor around the conveyor frame, means for actuating the conveyor including a driving gear mounted on said shaft and motion transmitting mechanism carried by the conveyor frame and including a gear meshing with the former gear, and means for tilting the conveyor frame about its axis, substantially as and for the purpose described.

In testimony whereof I have hereunto signed my name, at Syracuse, in the county of Onondago, and State of New York, this 21st day of April, 1920.

FLOYD C. VAN ESELTINE.